US008838289B2

(12) United States Patent
Margolin (10) Patent No.: US 8,838,289 B2
(45) Date of Patent: Sep. 16, 2014

(54) SYSTEM AND METHOD FOR SAFELY FLYING UNMANNED AERIAL VEHICLES IN CIVILIAN AIRSPACE

(76) Inventor: Jed Margolin, VC Highlands, NV (US)

( * ) Notice: Subject to any disclaimer, the term of this patent is extended or adjusted under 35 U.S.C. 154(b) by 2419 days.

(21) Appl. No.: 11/736,356

(22) Filed: Apr. 17, 2007

(65) Prior Publication Data

US 2008/0033604 A1 Feb. 7, 2008

Related U.S. Application Data

(60) Provisional application No. 60/745,111, filed on Apr. 19, 2006.

(51) Int. Cl.
*G06F 19/00* (2011.01)

(52) U.S. Cl.
USPC ........ 701/2; 3/4; 3/11; 3/14; 3/36; 244/158.1; 244/189; 244/190

(58) Field of Classification Search
USPC ............... 701/2, 3, 4, 11, 14, 36, 28, 120; 244/158.1, 189, 190
See application file for complete search history.

(56) References Cited

U.S. PATENT DOCUMENTS

| | | | |
|---|---|---|---|
| 5,153,836 A | 10/1992 | Fraughton et al. | |
| 5,187,485 A | 2/1993 | Tsui et al. | |
| 5,904,724 A * | 5/1999 | Margolin | 701/120 |
| 7,747,364 B2 * | 6/2010 | Roy et al. | 701/28 |
| 7,765,038 B2 * | 7/2010 | Appleby et al. | 701/23 |
| 2005/0004723 A1 * | 1/2005 | Duggan et al. | 701/24 |
| 2006/0174221 A1 | 8/2006 | Kinsella et al. | |

OTHER PUBLICATIONS

Sensing Requirements for Unmanned Air Vehicles, AFRL's Air Vehicles Directorate, Control Sciences Division, Systems Development Branch, Wright-Patterson AFB OH, Jun. 2004, www.afrlhorizons.com/Briefs/Jun04/VA0306.html.
Presentation: Developing Sense & Avoid Requirements for Meeting an Equivalent Level of Safety given by Russ Wolfe, Technology IPT Lead, Access 5 Project at UVS Tech 2006. (Jan. 18, 2006).
Presentation: Integration into the National Airspace System (NAS) given by John Timmerman of the FAA's Air Traffic Organization (Jul. 12, 2005).
Zone Ready for Drone, Apr. 7, 2006 on the web site for the FAA's Air Traffic Organization Employees, www.ato.faa.gov/DesktopDefault.aspx?tabindex=4&tabid=17&itemid=937&mid=103.
Virtual Cockpit Window for a Windowless Aerospacecraft NASA Tech Brief, Jan. 2003 p. 40. www.nasatech.com/Briefs/Jan03/MSC23096.html.
Press Release from Rapid Imaging Software, Inc. www.landform.com/pages/PressRelease.htm "On Dec. 13, 2001, Astronaut Ken Ham successfully flew the X-38 from a remote cockpit . . . ".
Article: Flying UAVs in Civil Airspace By Using Synthetic Vision Jed Margolin, www.jmargolin.com/todo/uavs.htm.
NTSB Incidnet Report on Crash of Predator on Apr. 25, 2006, northwest of Nogales, NM. NTSB Identification CHI06MA121.

(Continued)

*Primary Examiner* — Ronnie Mancho (57) ABSTRACT

A system and method for safely flying an unmanned aerial vehicle (UAV), unmanned combat aerial vehicle (UCAV), or remotely piloted vehicle (RPV) in civilian airspace uses a remotely located pilot to control the aircraft using a synthetic vision system during at least selected phases of the flight such as during take-offs and landings.

12 Claims, 4 Drawing Sheets

(56) References Cited

OTHER PUBLICATIONS

Lockheed's Polecat UCAV Demonstrator Crashes Aviation Week & Space Technology, Amy Butler, Mar. 19, 2007, p. 44.
The F-22 Continues to Encounter Aviation Week & Space Technology, Feb. 26, 2007, p. 18.
Gulf of Mexico Helo Ops Ready for ADS-B Aviation Week & Space Technology, Frances Fiorino, Feb. 26, 2007, p. 56.
Embedded Experts: Fix code bugs or cost lives, Rick Merit, EE Times, Apr. 10, 2006 www.eetimes.com/showArticle.jhtml?articleID-184429901.
Entries from the Software Failure Hall of Shame, Part 1, Tom Rhinelander, Jul. 6, 2006, www.g2zero.com/2006/07/notable_entries_from_the_softw_1.html.
Hardware-in-the-Loop Simulation, Martin Gomez, Embedded Systems Design, Nov. 30, 2001, www.embedded.com/shoArticle.jhtml?articleID=15201692.
Supreme Court Decision, *Boyle* v. *United Technologies Corp.*, 487 U.S. 500 (1988).
Basic Concepts of real-time operating systems, David Kalinsky (Nov. 18, 2003) http://linuxdevices.com/articles/AT4627965573.html.

* cited by examiner

SYSTEM AND METHOD FOR SAFELY FLYING UNMANNED AERIAL VEHICLES IN CIVILIAN AIRSPACE

CROSS REFERENCES TO RELATED APPLICATIONS

This application claims the benefit of U.S. Provisional Application No. 60/745,111 filed on Apr. 19, 2006.

BACKGROUND OF THE INVENTION

1. Field of Invention

This invention relates to the field of remotely piloted vehicles (RPVs) and unmanned aerial vehicles (UAVs). RPV is an older term for UAV. UCAV shall mean "Unmanned Combat Aerial Vehicle." UCAV is also sometimes defined as an "Uninhabited Combat Aerial Vehicle." UCAV is a UAV that is intended for use in combat. UAS means "Unmanned Aerial System." UCAS means "Unmanned Combat Air System." ROA means "Remotely Operated Aircraft." The characteristics all these vehicles have in common is that there is no human pilot onboard and although they may be operated autonomously they can also be controlled by a remotely located operator or pilot. The term UAV shall be used as a generic term for such vehicles. "Synthetic Vision" is the current term for three dimensional projected image data presented to the pilot or other observer. Another term for "Synthetic Vision" is "Synthetic Environment." An older term for "Synthetic Vision" is "Virtual Reality." The term "Augmented Reality" (AR) refers to a human/computer interaction in which synthetic, computer generated elements are mixed or juxtaposed with real world elements in such a way that the synthetic elements appear to be part of the real world. A common method used by Augmented Reality systems is to combine and overlay a synthetic vision system with the video from one or more video or infrared cameras. Augmented Reality is also sometimes referred to as "Enhanced Vision." The term "Remote Pilot" shall mean the same as "Remote Operator." The term "Sense and Avoid" shall mean the same as "See and Avoid."

2. Prior Art

The use of Synthetic Vision in flying a UAV is taught by U.S. Pat. No. 5,904,724 Method and apparatus for remotely piloting an aircraft issued May 18, 1999 to Margolin (the present Applicant) which is hereby incorporated by reference. From the Abstract:

A method and apparatus that allows a remote aircraft to be controlled by a remotely located pilot who is presented with a synthesized three-dimensional projected view representing the environment around the remote aircraft. According to one aspect of the invention, a remote aircraft transmits its three-dimensional position and orientation to a remote pilot station. The remote pilot station applies this information to a digital database containing a three dimensional description of the environment around the remote aircraft to present the remote pilot with a three dimensional projected view of this environment. The remote pilot reacts to this view and interacts with the pilot controls, whose signals are transmitted back to the remote aircraft. In addition, the system compensates for the communications delay between the remote aircraft and the remote pilot station by controlling the sensitivity of the pilot controls.

The system by which an aircraft periodically transmits its identification, location, altitude, and bearing was taught by U.S. Pat. No. 5,153,836 issued Oct. 10, 1992 to Fraughton et al. and was materially adopted by the FAA as Automatic Dependent Surveillance-Broadcast (ADS-B). According the article Gulf of Mexico Helo Ops Ready for ADS-B in Aviation Week & Space Technology (Feb. 26, 2007, page 56):

By the end of 2010, FAA expects to have the ADS-B system tested and operationally acceptable for the NAS, with Houston Center providing services in the Gulf region. By 2013, all of the U.S. is scheduled to be covered with ground infrastructure.

Current Practice

The current practice in flying UAVs in civilian airspace is typified by the report Sensing Requirements for Unmanned Air Vehicles by AFRL's Air Vehicles Directorate, Control Sciences Division, Systems Development Branch, Wright-Patterson AFB OH, June 2004, which relies on computer-intelligence to use sensors to sense and avoid other aircraft.

According to the presentation entitled Developing Sense & Avoid Requirements for Meeting an Equivalent Level of Safety given by Russ Wolfe, Technology IPT Lead, Access 5 Project at UVS Tech 2006 this had not changed as of Jan. 18, 2006. Access 5 was a national project sponsored by NASA and Industry with participation by the FAA and DOD to introduce high altitude long endurance (HALE) remotely operated aircraft (ROA) to routine flights in the National Airspace System (NAS). Access 5 started in May 2004 but when NASA withdrew its support (and funding) the Industry members decided not to spend their own money and Access 5 was dissolved at the end of 2005.

The presentation Integration into the National Airspace System (NAS) given by John Timmerman of the FAA's Air Traffic Organization (Jul. 12, 2005) essentially says that under current UAS Operations in the NAS UAVs should not harm other aircraft or the public. (Page 3: "While ensuring 'no harm' to other NAS customers and public")

The article Zone Ready for Drone, Apr. 7, 2006, on the web site for the FAA's Air Traffic Organization Employees states that, Since March 29, a temporary flight restriction . . . has limited access to the airspace along almost 350 miles of the border, expanding an earlier TFR near Nogales. The restriction is in effect nightly from 6 p.m. to 9 a.m., although that time can be expanded by issuance of a Notice to Airmen. Aircraft wishing to fly in the TFR when it is active must receive authorization from air traffic control prior to entry. Once in, pilots are required to maintain two-way communication with ATC and transmit a discrete transponder code.

The reason for the TFR is to enable Predator UAVs to patrol the border. The article quotes Stephen Glowacki, a Systems Safety and Procedures specialist with the FAA's Air Traffic Organization as saying:

This is an extreme situation that has been presented to us," states Stephen Glowacki, a Systems Safety and Procedures specialist with the FAA's Air Traffic Organization, stressing the nation's security. "We have been working with U.S. Customs and Border Protection to try and answer this situation."

Inserting UASs into the National Airspace System is not a simple feat. According to Glowacki, the technology and certification that will permit unmanned aircraft to "see and avoid" other air traffic is still eight to ten years away. In the mean time, a carefully controlled environment is needed.

The track record of current UAV systems shows two major problem areas:

a. The communications link between the UAV and the ground station is unreliable, even at short ranges.

A recent example is the December 2006 crash of Lockheed Martin's Polecat UAV. When it lost communications with the ground it deliberately crashed itself to avoid flying into civil airspace. (See the article Lockheed's Polecat UCAV Demonstrator Crashes in Aviation Week & Space Technology, Mar. 19, 2007, page 44.)

b. Autonomous Mode is not always very smart.

On Apr. 25, 2006 the Predator UAV being used by the U.S. Customs and Border Protection agency to patrol the border crashed in Nogales, Ariz. According to the NTSB report (NTSB Identification CHI06MA121) when the remote pilot switched from one console to another the Predator was inadvertently commanded to shut off its fuel supply and "With no engine power, the UAV continued to descend below line-of-site communications and further attempts to re-establish contact with the UAV were not successful." In other words, the Predator crashed because the system did not warn the remote pilot he had turned off the fuel supply and it was not smart enough to turn its fuel supply back on. (Note that this is the same Predator discussed in the article Zone Ready for Drone previously mentioned.)

SUMMARY OF THE INVENTION

It is important when flying a UAV in an airspace shared with other aircraft, both civilian and military, that collisions during all phases of flight (including taking off and landing) not happen. The current method for accomplishing this is to place restrictions on all other traffic in an air corridor representing the path of the intended flight of the UAV, thereby inconveniencing other traffic and disrupting the National Airspace System.

Synthetic Vision

One objective of the present invention is to allow UAVs to safely share airspace with other users by using synthetic vision during at least some of the phases of the UAV's flight so that changes required to existing FAA rules and regulations are minimized.

This may be accomplished by requiring that during selected phases of the flight the UAV be flown by a remote pilot using a Synthetic Vision System such as the one taught by U.S. Pat. No. 5,904,724 Method and apparatus for remotely piloting an aircraft. These selected phases include:
  (a) When the UAV is within a selected range of an airport or other designated location and is below a first specified altitude. This first specified altitude may be set high enough that, for all practical purposes, it may be considered unlimited.
  (b) When the UAV is outside the selected range of an airport or other designated location and is below a second specified altitude.

Each UAV flown under these conditions must be under the direct control of a remote pilot whose sole responsibility is the safe operation of that UAV. The rules will be similar to those for operating piloted aircraft with automatic pilot systems including those with autoland capability.

UAVs not flying in airspace where the use of a Synthetic Vision System is required may be flown autonomously using an Autonomous Control System (ACS) as long as the following conditions are met:
  (a) A remote pilot monitors the operation of the UAV at all times.
  (b) The ACS periodically transmits its identification, location, altitude, and bearing. This information may also be broadcast by UAVs when operated by remote pilots using Synthetic Vision.

All UAVs must use Radar (either active or passive) or other device to detect the range and altitude of nearby aircraft in order to perform "see and avoid" actions.

All UAVs must provide a means for Air Traffic Control (ATC) and the pilots of other aircraft to communicate directly with the remote pilot.

The preferred method for flying a UAV from one airport to another, such as in ferrying UAVs, would be to have the remote pilot at the originating airport be responsible for taking off and flying the UAV to the specified altitude. A remote pilot at the arrival airport would be responsible for having the UAV descend and land. In between, once the UAV has reached the specified altitude and range the remote pilot monitoring the flight can be at any convenient location.

Synthetic Vision may be enhanced by combining and/or overlaying it with the video from one or more video or infrared cameras or from synthetic aperture radar.

The method described does not require material changes in the present air control system. It would also make UAV flights safer than most existing piloted flights where "see and avoid" is accomplished by looking out small windows providing a limited field of view and hoping you see any nearby aircraft in time to avoid a collision.

Communication Link Failures

The exact cause of the failure of the communications link in the Polecat crash mentioned previously has not been made public. Technical details for UAVs are limited because the systems are developed by private industry which generally considers such information proprietary. In addition, these are mostly military programs which limits public disclosure even more. (Indeed, although the Polecat crash took place in December 2006, it was not publicly reported until March 2007.)

One factor that may cause a communication link to fail is if it is a high-bandwidth link since a high-bandwidth link is more susceptible to interference from other signals than is a lower-bandwidth link. The use of a synthetic vision system allows a lower-bandwidth link to be used which improves its reliability Another factor that affects a digital communications link when digital packets are sent through a network (such as an Internet-style network) is that the latency of the data packets cannot be assured either because the path may change from packet to packet or because packets may be lost. When data packets are lost the destination server usually times out and a request to resend the packet is issued which further increases the latency. Packets may also be lost simply because the path to a server takes longer than the server's timeout period, causing the server to issue an unending series of requests to resend the packet. If a packet is lost, either outright or because the path is longer than the timeout period, transmission of data may stop entirely as most people who use the Internet have experienced.

Because each data packet may take a different path, data packets may be received out-of-order. Standard Internet browsers such as Firefox and Microsoft Internet Explorer know to reassemble the packets in the correct order. A custom software application, such as that used to control UAVs, must do likewise to avoid becoming confused as to what is happening when.

Some communications link failures may simply be due to the failure of the system to measure and adapt to the changing latency of the data packets. The importance of having the system measure and adapt to changing latencies is discussed in U.S. Pat. No. 5,904,724 by the present inventor.

Minimizing Communications Link Failures

Communications Link Failures can be minimized by, first of all, properly designing the communications link to prevent the obvious types of failures described above.

The next step is to provide redundant communications links. In addition to the standard types of communications links, an emergency backup communications link can use the standard commercial cell phone network as long as precautions are taken to keep hackers out. Casual hackers can be kept out by using Caller ID so if the UAV receives a call from an unauthorized number it answers the line and immediately hangs up. The reason this keeps out only casual hackers is because PBXs (Private Branch Exchanges) can be programmed to deliver any Caller ID number the PBX operator desires. Once the UAV User is authenticated the ACS hangs up and calls one or more preprogrammed telephone numbers to establish a link to be used for communications. Because of the time needed to establish this link it may be desirable to keep the emergency backup communications link on hot standby during takeoffs and landings. Keeping this link on hot standby during all phases of flight also provides a backup method for tracking the UAV by using the cell phone tower triangulation method. As with the standard communications links all data must be securely encrypted and the User must be periodically authenticated.

What to Do if the Communication Link Fails

If even the emergency backup Communications Link fails there is no choice but to go to the Autonomous Control System (ACS). What ACS does depends on the flight profile of the UAV.
a. If the UAV is on the runway on takeoff roll and is below V1 (the maximum abort speed of the aircraft) the takeoff is aborted.
b. If the UAV is between V1 and V2 (the minimum takeoff safety speed for the aircraft) the choice is nominally between aborting the takeoff (and overrunning the runway) and taking off. If all other UAV systems are operating properly, taking off is probably the better choice since it may be possible to re-establish the communications link once the UAV is in the air. However, if the UAV is equipped with a tailhook and the runway is equipped with arresting cables a suitable distance before the physical end of the runway, the UAV takeoff may still be safely aborted. The hook and arresting cable method is the standard method used on aircraft carriers for landing aircraft.
c. If the UAV is above V2 the UAV takes off and uses the takeoff profile that is assigned to each particular airport. It then climbs to an altitude high enough to avoid other traffic and, unless the communication link can be firmly established, flies to the nearest airport designated to receive UAVs in distress. Only in extreme cases should the ACS fly the UAV to a designated crash site.

Autonomous Mode is not Always Very Smart or Even Bug-Free

As noted in the case of the Predator previously mentioned, it crashed because the system did not warn the remote pilot he had turned off the fuel supply and it was not smart enough to turn its fuel supply back on. This may have been a design oversight or it may have been a software bug. Complex computer programs always have bugs no matter how brilliant or motivated the programmer(s). Treating every software error as a mistake to be punished only leads to paralysis so that no code gets written. After a good faith effort is made to "get it right" the systems must be thoroughly tested. And they must be tested on the ground.

Testing

Complex systems are difficult to test, especially when one of its parts is a flying machine which, itself, is made up of several systems. Simulation of the individual subsystems is not good enough. A simulation of the entire system is also not good enough because, despite the best efforts, a simulation might not completely characterize the actual hardware and how the different hardware systems act together. The answer is to use Hardware-in-the-Loop simulation where the actual hardware is used with simulated inputs. A good description of Hardware-in-the-Loop simulation can be found in the article Hardware-in-the-Loop Simulation by Martin Gomez in Embedded Systems Design (Nov. 30, 2001). The example Mr. Gomez used was an autopilot.

Figure 3:
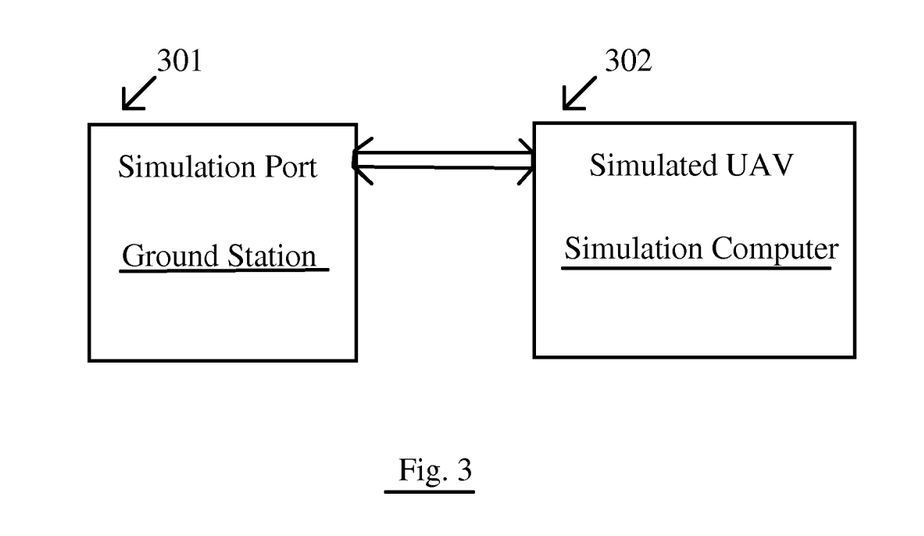
FIG. 3 shows the simplest system for simulating the UAV system where an actual ground station is connected directly to a simulation computer that simulates the UAV.
Figure 4:
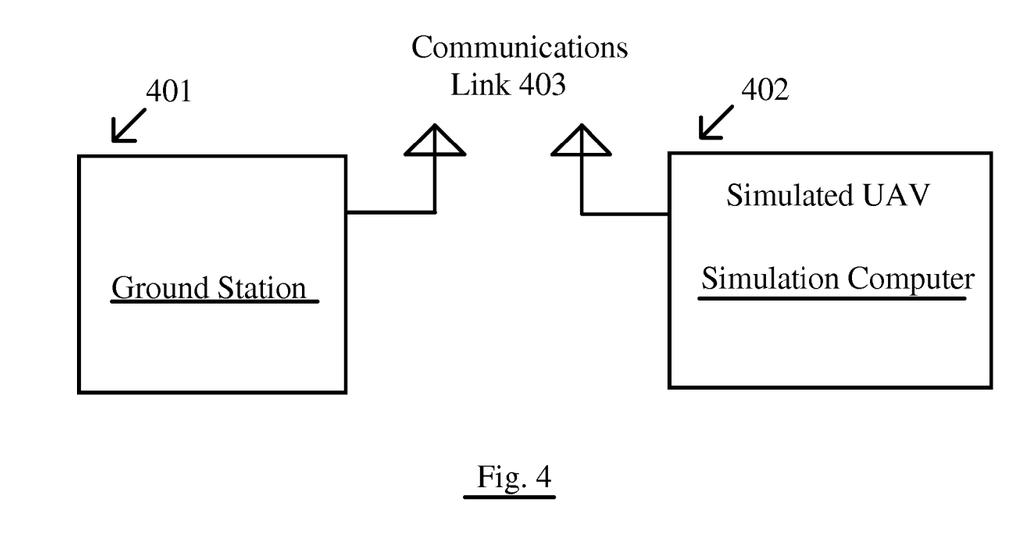
FIG. 4 shows a system for simulating the UAV system that includes an actual communications link.

The Ground Station is already on the ground so the proper place to start is with an actual ground station. The simplest configuration is to use an actual ground station with a simulation port connected directly to a computer that simulates the UAV. (See FIG. 3). That probably isn't good enough because it only really tests the ground station. The next step is to use a ground station with an actual communication link. (See FIG. 4.) This tests the ground station and the communications link.

Since the idea is to test the UAV without actually flying it, the idea of Hardware-in-the-Loop testing is to use as much of the UAVs hardware as possible by using a computer to read the system's output control signals and present the proper sensor input signals. In between is a simulation of the physical model of how the UAV interacts with the physical universe. The UAV lives in an analog universe where space and time are continuously variable, subject only to the Planck Distance and Planck Time. (The Planck length is the scale at which classical ideas about gravity and space-time cease to be valid, and quantum effects dominate. This is the 'quantum of length', the smallest measurement of length with any meaning, roughly equal to $1.6 \times 10^{-35}$ m. The Planck time is the time it would take a photon traveling at the speed of light to cross a distance equal to the Planck length. This is the 'quantum of time', the smallest measurement of time that has any meaning, and is equal to $10^{-43}$ seconds.) The UAV's universe is also massively parallel, which is why simulating it with a single computer which is forced to perform different functions sequentially may not always produce accurate results. This can be ameliorated somewhat by oversampling and running the model faster than that required by Nyquist. (The Nyquist rate is the minimum; you don't have to settle for the minimum.)

Ideally each sensor input and each actuator output should have its own processor and all the processors should be linked to a computer that contains the overall physical model of the UAV's universe (the Universe Processor). For example, the Universe Processor knows the location of the UAV, its attitude, its bearing, the air temperature and pressure, local weather, terrain, etc. This assumes that the sensors and actuators are completely characterized. If they are not, then the physical sensors and actuators can be used with devices that provide the proper physical stimulation to the sensors and measure the actual physical results of the actuators. The desired end result is that each device in the UAV flight hardware, especially if it contains software such as the Flight Control Computer, can be operated with its actual hardware and software. When the hardware or software is changed, the old device can be unplugged and the new version installed. This avoids the problem of relying on software that has been ported to hardware other than the hardware it runs on in the flight UAV. For example, the "C" programming language can be difficult to port to different computers because the definition of a "byte" in "C" can be different depending on the computer. Also note that the speed of the link connecting the sensors/actuators to the Universe Processor is determined by the speed of the fastest sensor/actuator, which also sets the minimum update rate of the Universe Processor.

The type of operating system(s) used in simulation and testing is important. In particular, with a non-deterministic Operating System (such as Windows) you cannot count on getting the same result every time because the operating system includes random timing components. From the article "Basic concepts of real-time operating systems" by David Kalinsky (Nov. 18, 2003):

> The key difference between general-computing operating systems and real-time operating systems is the need for "deterministic" timing behavior in the real-time operating systems. Formally, "deterministic" timing means that operating system services consume only known and expected amounts of time. In theory, these service times could be expressed as mathematical formulas. These formulas must be strictly algebraic and not include any random timing components. Random elements in service times could cause random delays in application software and could then make the application randomly miss real-time deadlines—a scenario clearly unacceptable for a real-time embedded system.
>
> General-computing non-real-time operating systems are often quite non-deterministic. Their services can inject random delays into application software and thus cause slow responsiveness of an application at unexpected times. If you ask the developer of a non-real-time operating system for the algebraic formula describing the timing behavior of one of its services (such as sending a message from task to task), you will invariably not get an algebraic formula. Instead the developer of the non-real-time operating system (such as Windows, Unix or Linux) will just give you a puzzled look. Deterministic timing behavior was simply not a design goal for these general-computing operating systems.

This means you may not be able to duplicate a failure. If you cannot duplicate a failure you cannot fix it. And, needless to say, the use of a non-deterministic Operating System in any part of the UAV flight hardware will result in a system that can never be completely trusted.

Failure to do proper ground-based simulation can lead to expensive and/or embarrassing incidents such as this one reported by Aviation Week & Space Technology (Feb. 26, 2007, page 18):

> The F-22 continues to encounter bumps in its first air expeditionary force deployment to Okinawa. The 12 aircraft from Langley AFB, Va., spent an unscheduled week at Hickam AFB, Hi., after the leading four had to abort the trip's last leg. As the Raptors reached the International Date Line, the navigation computers locked up so the aircraft returned to Hickam until a software patch was readied. "Apparently we had built an aircraft for the Western Hemisphere only," says a senior U.S. Air Force official. When the F-22s arrived at Kadena AB, Okinawa, some Japanese citizens held a protest against the aircraft's noise.

Although the F-22 is not a UAV the principle is the same.

Testbeds can be used for more than just verifying that the system works as designed. They can also be used to verify that the system is designed properly for the User.

In military programs, operational procedures can be developed and military personnel can be ordered to follow them. And they will follow them to the best of their ability because their careers are on the line. That doesn't change the fact that people operating poorly designed systems are more likely to make mistakes.

Producing UAVs for the commercial market requires a different mindset. Civilians cannot be ordered to use a system whose design makes mistakes likely or maybe even inevitable. Civilians have the option to not buy the product if they don't like it. They also have the option to sue the manufacturer of a system whose design makes mistakes inevitable. Civilians injured on the ground also have the option to sue the manufacturer of a system whose design makes mistakes inevitable.

Perhaps the UAV Industry can learn from the Video Game Industry where the standard practice is to hold focus groups early in the game's development using real video game players. Game Designers may not like the players' comments about their game but the players represent the game's ultimate customers. In addition, the video game companies employ people whose sole job is to extensively play the game before it is released and take careful notes of bugs, which are then passed on to the Game Developers. Although it is tempting to cut short the time devoted to testing in order to get the product out the door, a game released with too many bugs will be rejected by the marketplace and will fail.

UAV manufacturers making UAV systems for the Government are protected from liability under the Supreme Court's 1988 decision in *Boyle v. United Technologies Corp*, 487 U.S. 500 (1988), where the Court held that if a manufacturer made a product in compliance with the government's design and production requirements, but it was defective and caused injury, the victim could not sue the manufacturer.

Since UAV manufacturers making UAV systems for the civilian market do not have this protection they should consider who their customers really are. Although civilian UAV systems will probably be operated by civilian-rated pilots (at least initially), in a sense the UAV manufacturers are really designing their systems to meet the requirements of the Insurance Industry and doing proper on-ground testing is essential in making UAVs that will fly safely in civilian airspace. Military UAVs should meet the same standard because the crash of a military UAV that injures or kills civilians could ignite a political firestorm that would ground the entire UAV fleet.

The Reasons for Using Synthetic Vision During at Least Takeoffs and Landings

There are several reasons why the use of synthetic vision during at least takeoffs and landings can minimize the risk to the public.

a. The ACS must be programmed to deal with every possible problem in every possible situation that might arise. This is probably not possible until computers become sentient.

Even after 100 years of aviation, pilots still encounter situations and problems that have not been seen before. The way they deal with new situations and problems is to use their experience, judgment, and even intuition. Pilots have been remarkably successful in saving passengers and crew under extremely difficult conditions such as when parts of their aircraft fall off (the top of the fuselage peels off) or multiply-redundant critical controls fail (no rudder control). Computers cannot be programmed to display judgment. They can only be programmed to display judgment-like behavior under conditions that have already been anticipated. UAVs should not be allowed to fly over people's houses until they are at least smart enough to turn on their own fuel supply.

Even so, this assumes the computer program has no bugs.

b. Complex computer programs always have bugs no matter how brilliant or motivated the programmer(s). As an example, look at almost every computer program ever written. (See the article Embedded Experts: Fix Code Bugs Or Cost Lives by Rick Merritt in EE Times, Apr. 10, 2006, as well as the article Entries from the Software Failure Hall of Shame, Part 1 by Tom Rhinelander in g2zero, Jul. 6, 2006. g2zero at www.g2zero.com is a community dedicated to discussing and advocating ways to improve software quality.)

While adding a sense-and-avoid capability to existing UAV systems is necessary it will increase the code complexity and increase the number of bugs in the software.

c. An Unmanned Combat Aerial Vehicle (UCAV) will have little chance against one flown by an experienced pilot using Synthetic Vision until Artificial Intelligence produces a sentient, conscious Being. At that point, all bets will be off because a superior sentient artificial Being may decide that war is stupid and refuse to participate. It may also decide that humans are obsolete or fit only to be its slaves.

Acceptable Risk

Since it is impossible to anticipate every possible problem that might arise and it is impossible to write completely bug-free code it comes down to what is an acceptable risk.

When a military aircraft is engaged in a military operation, a great deal of risk may be acceptable, especially if it is on a critical mission.

It is unacceptable to expose civilian aircraft flying in civil airspace, as well as the public on the ground, to this same level of risk except under truly exceptional circumstances.

Synthetic Vision puts a human directly in the loop and makes flying a UAV in civilian airspace at least as safe as flying an aircraft with the pilot onboard.

BRIEF DESCRIPTION OF THE DRAWINGS

The invention may best be understood by referring to the following description and accompanying drawings which illustrate the invention. In the drawings.

DETAILED DESCRIPTION

In the following description, numerous specific details are set forth to provide a thorough understanding of the invention. However, it is understood that the invention may be practiced without these specific details. In other instances well-known circuits, structures, and techniques have not been shown in detail in order not to obscure the invention.

Figure 1:
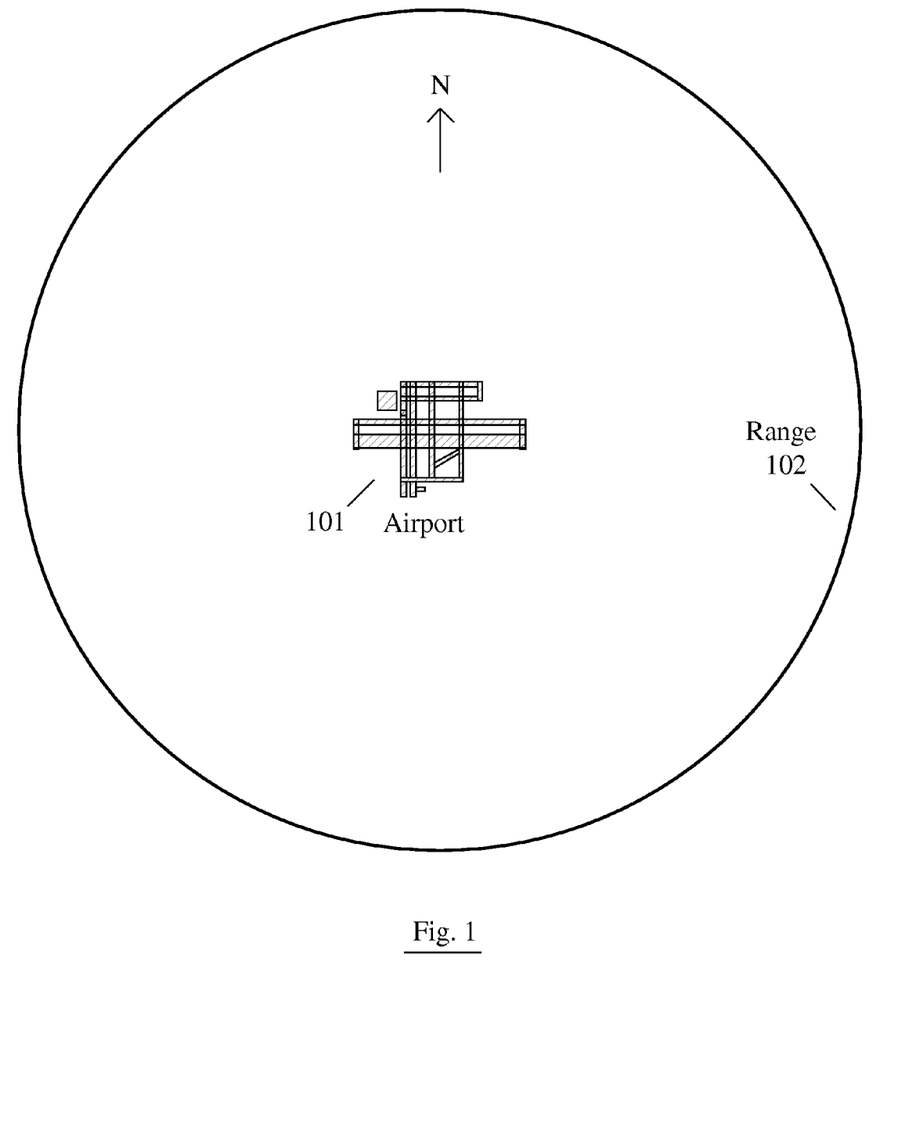
FIG. 1 is a general illustration showing a circular area of Range 102 around Airport 101.
Figure 2:
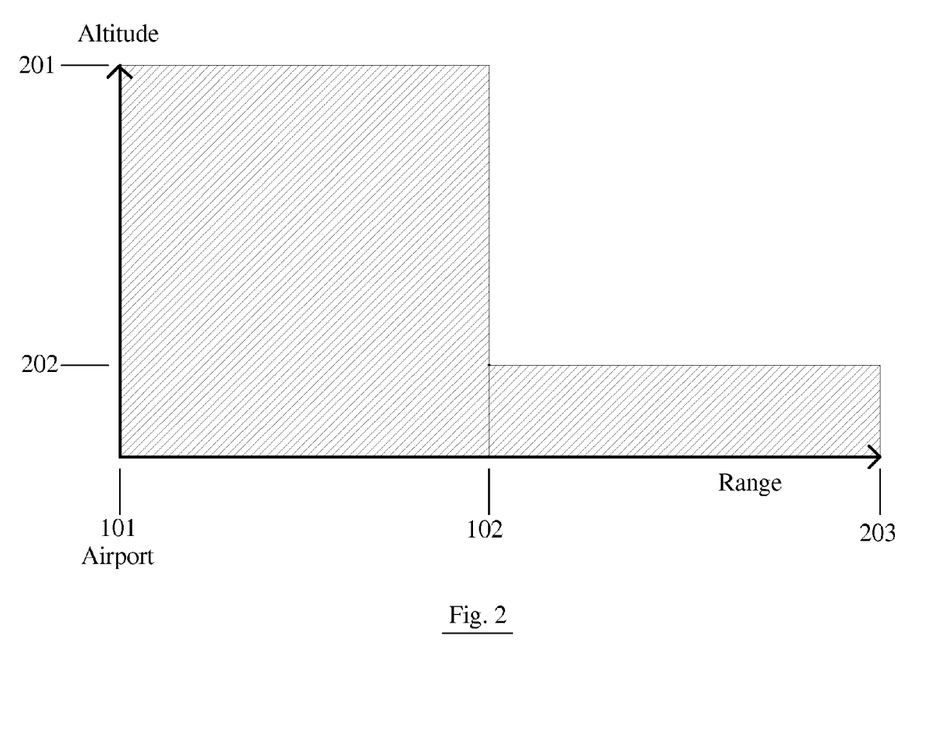
FIG. 2 is a general illustration showing the airspace around Airport 101 where UAVs must be flown by a remote pilot using synthetic vision. This airspace is represented by the hatched areas.

FIG. 1 shows a Distance Range 102 around Airport 101. While a circular area is shown for convenience any area whose shape can be defined may be used such as a square, rectangle, or other polygon. While FIG. 1 shows the area around an airport any other designated location may be specified. FIG. 2 shows an altitude profile of the airspace surrounding Airport 101. When the UAV is within Distance Range 102 of Airport 101 at an altitude below Selected Altitude 201 the UAV must be flown by a remote pilot using a Synthetic Vision System such as the one taught by U.S. Pat. No. 5,904,724 Method and apparatus for remotely piloting an aircraft. When the UAV is outside Distance Range 102, within Distance Range 203, and is below Selected Altitude 202 the UAV must also be flown by a remote pilot using a Synthetic Vision System. The airspace where the UAV must be flown by a remote pilot using a Synthetic Vision System is represented by the hatched areas in FIG. 2.

Each UAV flown under these conditions must be under the direct control of a remote pilot whose sole responsibility is the safe operation of that UAV. The rules will be similar to those for operating piloted aircraft with automatic pilot systems including those with autoland capability.

UAVs flying beyond Distance Range 102, within Distance Range 203, and above Altitude 202 may be flown autonomously using an Autonomous Control System (ACS) as long as the following conditions are met:

(a) A remote pilot must monitor the operation of the UAV at all times. A remote pilot may monitor several UAVs simultaneously once it is established that this practice may be safely performed by a single pilot. For example, it may be preferable to have two remote pilots work as a team to monitor ten UAVS than to have each remote pilot separately monitor a group of five UAVs.

(b) The ACS must periodically transmit its identification, location, altitude, and bearing. This may be done through the use of a speech synthesis system on a standard aircraft communications frequency. This is for the benefit of pilots flying aircraft sharing the airspace. It may also be done through an appropriate digital system such as the one taught in U.S. Pat. No. 5,153,836 Universal dynamic navigation, surveillance, emergency location, and collision avoidance system and method adopted by the FAA as ADS-B. This information may also be broadcast by UAVs when operated by remote pilots using Synthetic Vision.

All UAVs must use radar (either active or passive) to detect the range and altitude of nearby aircraft in order to perform "see and avoid" actions. An example of a passive radar system is taught by U.S. Pat. No. 5,187,485 Passive ranging through global positioning system. Other devices for detecting the range and altitude of nearby aircraft may also be used.

All UAVs must provide a means for Air Traffic Control (ATC) and the pilots of other aircraft to communicate directly with the remote pilot. This may be accomplished by having the communication link between the remote pilot and the UAV relay communications with a standard aircraft transceiver onboard the UAV.

Distance Range 203 extends to where it meets the area covered by another designated location such as another airport. The entire area covered by Distance Range 203 is termed a Designated Area. Another type of Designated Area is a large body of open water where the minimum safe altitude is determined by the height of a large ship riding the crest of a large wave.

The preferred method for flying a UAV from one airport to another, such as in ferrying UAVs, would be to have the remote pilot at the originating airport be responsible for taking off and flying the UAV to the specified altitude. A remote pilot at the arrival airport would be responsible for having the UAV descend and land. This is similar to the longstanding practice of using Harbor Pilots to direct the movement of ships into and out of ports. In between the originating airport and destination airport, once the UAV has reached the specified altitude and range the remote pilot monitoring the flight can be at any convenient location.

Long delays in the communications link (such as through geosynchronous satellites) make flying the UAV by direct control using synthetic vision more difficult and should be avoided.

The method described does not require material changes in the present air control system. It would also make UAV flights safer than most existing piloted flights where "see and avoid" is accomplished by looking out small windows providing a limited field of view and hoping you see any nearby aircraft in time to avoid a collision.

While preferred embodiments of the present invention have been shown, it is to be expressly understood that modifications and changes may be made thereto.

What is claimed is:

1. A system for safely flying an unmanned aerial vehicle in civilian airspace comprising:
    (a) a ground station equipped with a synthetic vision system;
    (b) an unmanned aerial vehicle capable of supporting said synthetic vision system;
    (c) a remote pilot operating said ground station;
    (d) a communications link between said unmanned aerial vehicle and said ground station;
    (e) a system onboard said unmanned aerial vehicle for detecting the presence and position of nearby aircraft and communicating this information to said remote pilot;
    whereas said remote pilot uses said synthetic vision system to control said unmanned aerial vehicle during at least selected phases of the flight of said unmanned aerial vehicle, and during those phases of the flight of said unmanned aerial vehicle when said synthetic vision system is not used to control said unmanned aerial vehicle said unmanned aerial vehicle is flown using an autonomous control system, wherein said selected phases of the flight of said unmanned aerial vehicle comprise:
    (a) when said unmanned aerial vehicle is within a selected range of an airport or other designated location and is below a first specified altitude;
    (b) when said unmanned aerial vehicle is outside said selected range of an airport or other designated location and is below a second specified altitude.

2. The system of claim 1 further comprising a system onboard said unmanned aerial vehicle for periodically transmitting the identification, location, altitude, and bearing of said unmanned aerial vehicle.

3. The system of claim 1 further comprising a system onboard said unmanned aerial vehicle for providing a communications channel for Air Traffic Control and the pilots of other aircraft to communicate directly with said remote pilot.

4. A system for safely flying an unmanned aerial vehicle in civilian airspace comprising:
    (a) a ground station equipped with a synthetic vision system;
    (b) an unmanned aerial vehicle capable of supporting said synthetic vision system;
    (c) a remote pilot operating said ground station;
    (d) a communications link between said unmanned aerial vehicle and said ground station;
    (e) a system onboard said unmanned aerial vehicle for detecting the presence and position of nearby aircraft and communicating this information to said remote pilot;
    whereas said remote pilot uses said synthetic vision system to control said unmanned aerial vehicle during at least selected phases of the flight of said unmanned aerial vehicle, and during those phases of the flight of said unmanned aerial vehicle when said synthetic vision system is not used to control said unmanned aerial vehicle said unmanned aerial vehicle is flown using an autonomous control system, and
    whereas the selected phases of the flight of said unmanned aerial vehicle comprise:
    (a) when said unmanned aerial vehicle is within a selected range of an airport or other designated location and is below a first specified altitude;
    (b) when said unmanned aerial vehicle is outside said selected range of an airport or other designated location and is below a second specified altitude.

5. The system of claim 4 further comprising a system onboard said unmanned aerial vehicle for periodically transmitting the identification, location, altitude, and bearing of said unmanned aerial vehicle.

6. The system of claim 4 further comprising a system onboard said unmanned aerial vehicle for providing a communications channel for Air Traffic Control and the pilots of other aircraft to communicate directly with said remote pilot.

7. A method for safely flying an unmanned aerial vehicle as part of a unmanned aerial system equipped with a synthetic vision system in civilian airspace comprising the steps of:
    (a) using a remote pilot to fly said unmanned aerial vehicle using synthetic vision during at least selected phases of the flight of said unmanned aerial vehicle, and during those phases of the flight of said unmanned aerial vehicle when said synthetic vision system is not used to control said unmanned aerial vehicle an autonomous control system is used to fly said unmanned aerial vehicle;
    (b) providing a system onboard said unmanned aerial vehicle for detecting the presence and position of nearby aircraft and communicating this information to said remote pilot; wherein said selected phases of the flight of said unmanned aerial vehicle comprise:
    (a) when said unmanned aerial vehicle is within a selected range of an airport or other designated location and is below a first specified altitude;
    (b) when said unmanned aerial vehicle is outside said selected range of an airport or other designated location and is below a second specified altitude.

8. The method of claim 7 further comprising the step of providing a system onboard said unmanned aerial vehicle for periodically transmitting the identification, location, altitude, and bearing of said unmanned aerial vehicle.

9. The method of claim 7 further comprising the step of providing a system onboard said unmanned aerial vehicle for providing a communications channel for Air Traffic Control and the pilots of other aircraft to communicate directly with said remote pilot.

10. A method for safely flying an unmanned aerial vehicle as part of a unmanned aerial system equipped with a synthetic vision system in civilian airspace comprising the steps of:
    (a) using a remote pilot to fly said unmanned aerial vehicle using synthetic vision during at least selected phases of the flight of said unmanned aerial vehicle, and during those phases of the flight of said unmanned aerial vehicle when said synthetic vision system is not used to control said unmanned aerial vehicle an autonomous control system is used to fly said unmanned aerial vehicle;

(b) providing a system onboard said unmanned aerial vehicle for detecting the presence and position of nearby aircraft and communicating this information to said remote pilot;

whereas said selected phases of the flight of said unmanned aerial vehicle comprise:

(a) when said unmanned aerial vehicle is within a selected range of an airport or other designated location and is below a first specified altitude;

(b) when said unmanned aerial vehicle is outside said selected range of an airport or other designated location and is below a second specified altitude.

11. The method of claim 10 further comprising the step of providing a system onboard said unmanned aerial vehicle for periodically transmitting the identification, location, altitude, and bearing of said unmanned aerial vehicle.

12. The method of claim 10 further comprising the step of providing a system onboard said unmanned aerial vehicle for providing a communications channel for Air Traffic Control and the pilots of other aircraft to communicate directly with said remote pilot.

* * * * *